United States Patent [11] 3,547,482

| [72] | Inventor | James Shaw<br>55 Cordelia Ave., Salt Lake City, Utah 84115 |
|---|---|---|
| [21] | Appl. No. | 782,807 |
| [22] | Filed | Dec. 11, 1968 |
| [45] | Patented | Dec. 15, 1970 |

[54] TRAILER HOUSE MODIFIED AS A COMBINATION CAMPER-TRAILER
5 Claims, 6 Drawing Figs.

[52] U.S. Cl...................................................... 296/23, 280/426
[51] Int. Cl....................................................... B60p 3/32
[50] Field of Search............................................ 296/23, 23MC; 280/426

[56] References Cited
UNITED STATES PATENTS

| 3,257,019 | 6/1966 | Carroll | 296/23MC |
| 3,383,119 | 5/1968 | Carroll | 296/23X |
| 3,393,922 | 7/1968 | Adams | 296/23MC |

*Primary Examiner*—Philip Goodman
*Attorney*—C. Harvey Gold and David V. Trask

ABSTRACT: A combination camper trailer house is adapted at one end for mounting above the bed of a traction vehicle as a truck-camper unit. The opposite end of the combination is mounted on wheels and is adapted to trail the traction vehicle when it is driven with the camper unit so mounted.

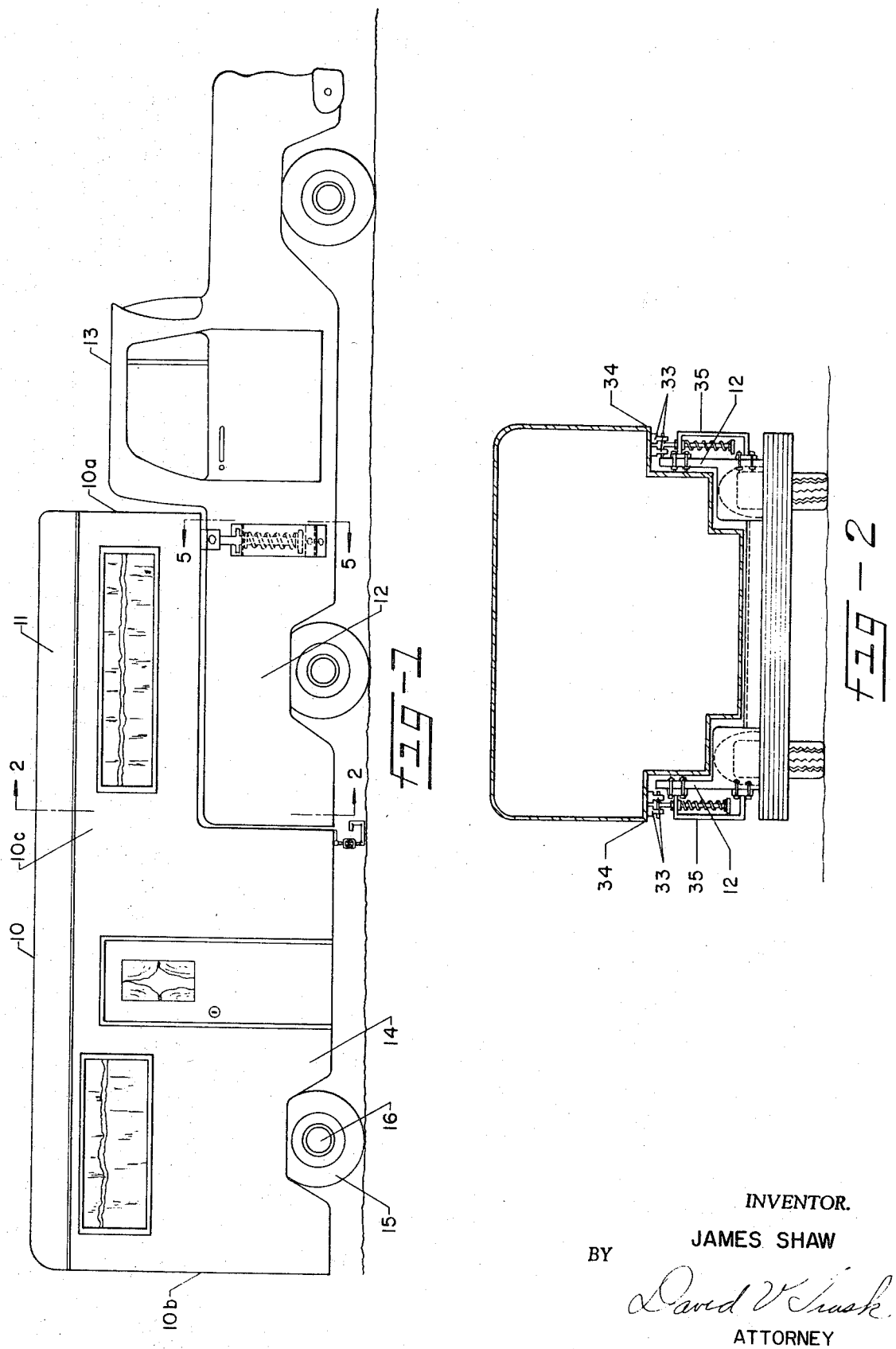

PATENTED DEC 15 1970 3,547,482

INVENTOR.
JAMES SHAW
BY
David V Trask
ATTORNEY 3,547,482

TRAILER HOUSE MODIFIED AS A COMBINATION CAMPER-TRAILER

BACKGROUND OF THE INVENTION

1. Field

This invention relates to trailer houses, specifically to camping trailers. It provides such a trailer with substantially increased living space for a given trailing length.

2. State of the Art

Certain outdoor pursuits, such as camping, involve the use of transportable living accommodations. Many persons prefer or require such accommodations be more substantial than a tent. Camping trailers, i.e., small house trailers which can be pulled behind a family automobile, have gained wide acceptance for this purpose; truck campers, which may be mounted on the bed or in the box of a traction vehicle, notably a truck, are also widely used. Although living accommodations of these types offer many advantages over tents, they provide limited living space. Neither camping trailers, nor truck campers can be increased much in size over presently available models without seriously impairing their mobility and general usefulness.

SUMMARY OF THE INVENTION

The present invention provides a trailer house modified as a combination camper-trailer. The combination includes a first compartment at one end adapted for mounting above the bed area of a traction vehicle as a camper unit and a second compartment at its opposite end mounted on trailing wheels. In this fashion the living space within the trailer is significantly increased for a given "trailing length." By "trailing length" is meant the distance between the back of the trailer and the back of the vehicle towing the trailer.

The portion of the trailer which is adapted for mounting; e.g., above a truck bed, will be referred to herein as its "camper unit"; the camper unit is considered to be located at the "camper end" of the trailer. The remainder of the trailer will be referred to herein as the "trailing unit" and is mounted on wheels to trail the truck when the camper unit is mounted above the truck bed. The truck bed may be open, such as on a flatbed truck, but usually comprises the bottom of the box of an open-box truck such as a pickup truck.

The trailer may be attached to the traction vehicle in a variety of ways, the preferred connecting means depending somewhat on the type of vehicle employed for towing the trailer. In general, any method of attachment may be employed, provided provision is made for the trailer to pivot on a horizontal transverse axis with respect to the vehicle. Such pivoting is necessary to insure good traction of the drive wheels of the vehicle and to prevent stresses on the trailer due to uneven road surfaces or changes in grade. The trailer wheels should normally be mounted on the underside of the trailing portion of the trailer. Usually, the trailer wheels pivot in tandem around individual axes in the same fashion conventionally employed for multiaxle trailers. When the camper unit is mounted above an open flat bed, it may, if desired, be connected to the bed to permit lateral pivoting of the vehicle with respect to the trailer. Pivoted trailing wheels may then not be required.

Preferred embodiments of the invention include stabilizing or support means for bracing the camper unit of the trailer against the ground when it is disconnected from the traction vehicle; for example, when the trailer is parked for storage or extended use in one location. These stabilizing means may be adapted as leveling means for the trailer, or such means may be separately provided. Either the stabilizing means, leveling means, or both may be incorporated in the means for connecting the trailer to the traction vehicle.

DESCRIPTION OF THE DRAWINGS

In the drawing, which illustrates what is presently considered to be the best mode for practicing the invention, FIG. 1 is a side view, in elevation, of a trailer of this invention mounted in the box of a pickup truck;

FIG. 2, a transverse cross-sectional view taken from the standpoint of the line 2-2 of FIG. 1;

DESCRIPTION OF THE ILLUSTRATED EMBODIMENT

Figure 3:
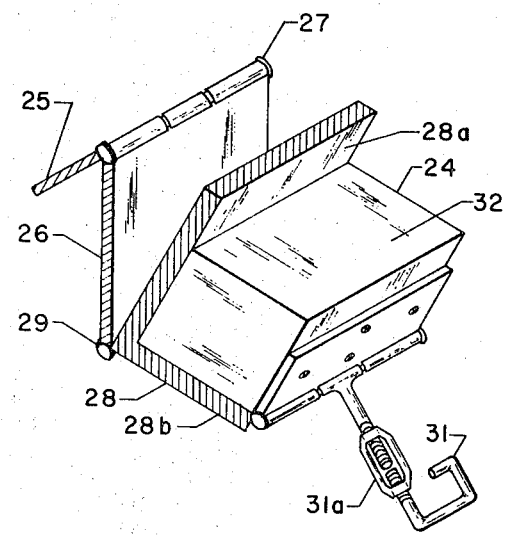
FIG. 3, a perspective view of mounting means for connecting the trailer on the back of the truck.

The illustrated trailer 10 includes a camper unit 11 mounted in the box 12 of a pickup truck 13. The camper unit is approximately as long as the truck box, extending from the front end 10a toward the rear 10b of the trailer. The trailer further includes a trailing unit 14 which extends from attachment with the camper unit at a location 10c behind the truck box 12 to the back end 10b of the trailer. The trailer unit is mounted on wheels 15 mounted to rotate individually in conventional fashion on an axle 16.

Figure 6:
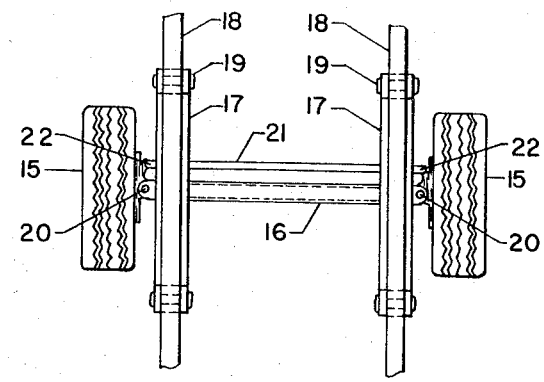
FIG. 6, a top view, in elevation, of the trailing wheel assembly.

FIG. 6 illustrates the trailing wheel assembly for the trailing unit of the trailer. Thus, the axle 16 is anchored to spring members 17 and the spring members are connected to the frame 18 of the trailer by connecting links 19 in conventional fashion. Each wheel is mounted to the axle by means of a pivot connection 20, as illustrated, to permit the wheels to pivot laterally with respect to the trailer. A tie rod 21 connects the wheels by means of pivot connections 22 so that the wheels turn in tandem to retain their parallel relationship.

Figure 4:
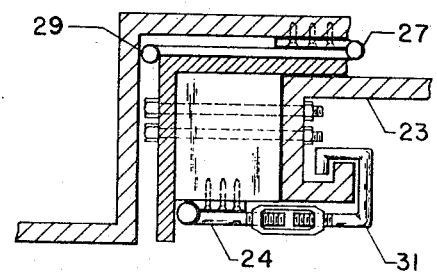
FIG. 4, a cross-sectional view of the trailer mounting means and truck bed and frame.

FIGS. 2 through 5 illustrate the manner in which the camper unit 11 of the trailer is mounted above the bed of the truck. As may be seen from FIG. 2, the lower portion of the camper unit fits loosely within the box 12 of the truck. The camper unit is mounted in such fashion as to permit normal movement of either end 10a, 10b up and down with respect to the box of the truck as the wheels of the trailer and truck, respectively, ride at different road elevations. In the illustrated instance, the trailer is attached to the back frame 23 of the truck by a pair of double-hinged hitching mechanisms 24. (FIGS. 3 and 4)

Referring to FIG. 3, the hitching mechanisms 24 each include an anchor plate 25, adapted for attachment to the underside of the camper unit as illustrated by FIG. 4. The anchor plate is linked to a lift plate 26 by a hinged connection 27. The lift plate 26 is in turn linked to a mounting bracket 28 by a hinged connection 29. The mounting bracket 28 includes a bearing member 28a for placement on the truck bed and a stop member 28b adapted for placement behind and parallel the back of the truck bed 30 as illustrated in FIG. 4. The mounting bracket is clamped to the frame 23 beneath the truck bed by means of a clamping member 31. In the illustrated instance, a spacer block, 32 is attached to the stop member 28b of the mounting bracket because the camper unit extends slightly beyond the back of the truck bed when it is mounted thereon. The clamping member 31 is hingedly connected to the downward end of the stop member 28b so that it may be swung down to function as stabilizing and leveling means in the manner illustrated in phantom in FIG. 1. The length of the clamping member is adjustable by a turnbuckle 31a. The double hinge arrangement of the hitching mechanisms allows the necessary freedom of vertical movement of the trailer with respect to the truck when the back of the trailer drops and the trailer pivots on hinged connection 29, causing the front of the trailer to lift. When the back of the trailer is lifted, the front of the trailer cannot drop appreciably. Thus, the lift plate 26, which is hinged at both ends by hinged connections 27 and 29, respectively, permits the center portion of the trailer to be lifted up from the truck bed.

Figure 5:
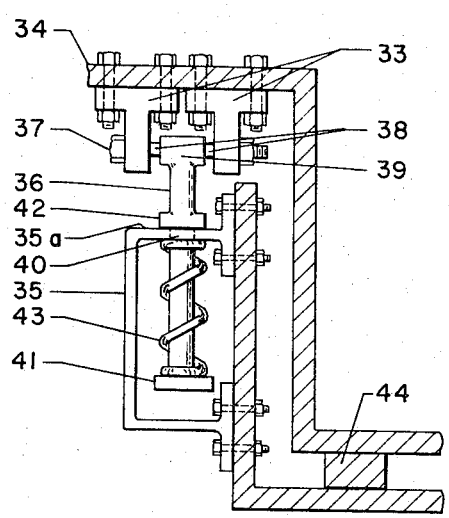
FIG. 5, a view, partially in cross section, from the standpoint of the line 5-5 of FIG. 1, showing the connection means for attaching the trailer to the truck.

The front of the camper unit is mounted to the front of the truck bed by special connecting means illustrated by FIG. 5 and located as illustrated by FIGS. 1 and 2. Referring to FIG. 5, a pair of downwardly depending lugs 33 are connected to the overhang 34 on each side of the camper unit. A bracket 35 is bolted to each side of the truck box 12 as illustrated. The camper and truck box are linked by a connecting rod 36, as shown, by fastening a bolt 37 through holes 38 in the lugs 33 and through an intermediate sleeve portion 39 carried at the upper end of the connecting rod 36. The connecting rod is positioned through a hole 40 in the upper end 35a of the bracket 35 and carries stop means 41 and 42 to check the travel of the connecting rod 36 through the hole 40. The connecting rod is biased toward its downward position; i.e., with stop 42 bearing against the upper end 35a of the bracket 35, by a spring 43. Thus, when the front of the camper unit is lifted, as a result of the trailing wheels 15 dropping with respect to the box of the truck, the connecting rod 36 slides upward through the hole 40. When the back of the trailer is lifted, the trailer pivots on the linkage connection formed by the bolt 37 and sleeve 39. If desired, additional support for the front of the camper unit may be provided by yieldable bearing blocks 44.

Although the invention has been described with particular reference to details of certain specific embodiments, it is not intended thereby to limit the scope of the invention except insofar as the details are recited in the appended claims. Many modifications within the scope of the claims will be suggested to those skilled in the art by the present disclosure. The configuration of the trailer may be altered considerably. For example, an extension may be provided on the front end 10a of the camper unit to project out over the cab of the truck, thereby providing additional sleeping or storage space.

I claim:

1. A trailer house, comprising:
 a first compartment adapted as a camper unit for mounting above the bed area of a traction vehicle;
 a second compartment adapted as a trailing unit mounted on wheels and rigidly connected to the said camper unit in position to trail the vehicle when the camper unit is mounted above said bed area; and
 connecting means for attaching the trailer to the vehicle for towing with the camper unit mounted above said bed area, including:
  a first element for attaching the trailing unit to the back of the truck, including means mounted to connect opposite sides of the camper unit to corresponding opposite sides of the truck bed, adapted to permit up and down movement of the front of the camper unit with respect to the truck; and
  a second element comprising an anchor plate adapted for attachment to the underside of the camper unit, hingedly connected to one end of a lift plate which is hingedly connected at its opposite end to a mounting bracket adapted for attachment to the back of the truck to permit pivoting of the trailer along a horizontal, transverse axis with respect to the truck.

2. A trailer house according to claim 1, wherein the second element of the connecting means includes a member adapted to swing down to function as support means for said house when it is parked.

3. A trailer house according to claim 1, wherein the trailing unit is mounted on an axle, with wheels at opposite ends tied to pivot in tandem.

4. A trailer house according to claim 3, wherein the camper unit is adapted for mounting in the box of an open-box truck.

5. A trailer house according to claim 4, wherein the second element of the connecting means is adapted to connect to the frame of the truck and the first element of the connecting means includes two parts mounted to connect opposite sides of the camper unit to corresponding opposite sides of the truck box.